(12) United States Patent
Mallary

(10) Patent No.: US 8,105,706 B2
(45) Date of Patent: Jan. 31, 2012

(54) MASTER SERVO PATTERN PRINTER

(75) Inventor: Michael Mallary, Sterling, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/620,509

(22) Filed: Nov. 17, 2009

(65) Prior Publication Data

US 2010/0196738 A1  Aug. 5, 2010

Related U.S. Application Data

(63) Continuation of application No. 11/096,519, filed on Apr. 1, 2005, now Pat. No. 7,618,721, which is a continuation-in-part of application No. 09/999,043, filed on Nov. 1, 2001, now abandoned.

(51) Int. Cl.
*G11B 5/66* (2006.01)
(52) U.S. Cl. ............... 428/827; 428/829; 360/16
(58) Field of Classification Search ............ None
See application file for complete search history.

(56) References Cited

U.S. PATENT DOCUMENTS

| | | | |
|---|---|---|---|
| 6,347,016 B1 * | 2/2002 | Ishida et al. | 360/17 |
| 6,858,328 B1 * | 2/2005 | Ishida et al. | 428/826 |
| 7,618,721 B1 * | 11/2009 | Mallary | 428/829 |

FOREIGN PATENT DOCUMENTS

| WO | WO98/03972 | * | 1/1998 |
|---|---|---|---|
| WO | WO99/49457 | * | 9/1999 |

* cited by examiner

*Primary Examiner* — Holly Rickman

(57) ABSTRACT

A master is provided for use in a magnetic printing process. Illustratively, the master is used for printing servo patterns on a magnetic recording medium. The master includes a substrate on which a magnetic underlayer material is disposed. A second magnetic material is disposed over the magnetic underlayer material so as to form a plurality of teeth adapted for use in the magnetic printing process. The teeth may be formed in the second material by an additive or subtractive process. Further, the dimensions of the teeth may be selected to optimize use of the master in a magnetic printing process on perpendicular media.

12 Claims, 4 Drawing Sheets

MASTER SERVO PATTERN PRINTER

TECHNICAL FIELD

The invention, relates to masters for printing servo patterns, systems containing such masters and methods of using such masters.

BACKGROUND

It is often desirable to imprint a magnetic pattern onto a medium (e.g., a disk, a tape, a credit card) in a predictable and reproducible manner. One approach to imprinting a magnetic pattern onto a medium is servo media printing. In servo media printing, the medium is first exposed to a magnetic field to form a uniform direction of pre-magnetization in the medium. The pre-magnetized medium is then contacted with a master for servo printing, and the pre-magnetized medium is exposed to a uniform magnetic field through the master. Typically, the uniform magnetic field is in a direction opposite to the direction of pre-magnetization of the medium.

The master for servo printing usually includes a substrate and a pattern of teeth disposed on the substrate. In general, the substrate is formed of a non-ferromagnetic material, and the teeth are formed of a ferromagnetic material. During servo printing, the pattern of ferromagnetic teeth in the master interacts with the uniform magnetic field to form a magnetic pattern in the recording medium.

In one type of servo printing, typically referred to as longitudinal media printing, the direction of pre-magnetization in the recording medium is parallel to the surface of the recording medium that contacts the master during the printing process. Ideally, after longitudinal media printing, the portions of the recording medium that were beneath the teeth during the printing process remain magnetized in the direction of pre-magnetization, and the portions of the medium that were not beneath the pattern of teeth during the printing process are magnetized in the direction of the uniform magnetic field.

In another type of printed media servo printing, often referred to as perpendicular media printing, the direction of pre-magnetization in the medium is perpendicular to the surface of the recording medium that contacts the master during the printing process. Ideally, after perpendicular media printing, the portions of the recording medium that were not beneath the pattern of teeth during the printing process remain magnetized in the direction of pre-magnetization, and the portions of the medium that were beneath the pattern of teeth during the printing process are magnetized in the direction of the uniform magnetic field.

SUMMARY

The invention relates to masters for servo printing, systems containing such masters and methods of using such masters. In general, the masters can be used in servo printing to provide recording media of relatively high quality. The masters can be particularly advantageous when perpendicular media printing is used to write on a recording medium.

In one aspect, the invention features a master for printing a servo pattern. The master includes a substrate, a layer of a first material disposed over at least a portion of a surface of the substrate and a pattern of a second material disposed over at least a portion of a surface of the layer of first material. The first material has a magnetic permeability of at least about five.

In some embodiments, the first material has a magnetic permeability of at least about 50, preferably around 100-1000. The magnetic permeability of a material refers to the ratio of the ferromagnetic susceptibility of the material to the ferromagnetic susceptibility of a vacuum.

The first material can be, for example, nickel, cobalt, iron, a nickel alloy, a cobalt alloy or an iron alloy. The second material can be, for example, nickel, cobalt, iron, a nickel alloy, a cobalt alloy or an iron alloy. The first and second materials can be the same material, or they can be different materials.

The pattern of the second material can be formed by etching portions of the layer of the first material. The pattern of the second material can be, for example, a pattern of teeth. In the example, the teeth preferably have a dimension of about 1 micrometer ("micron") in a direction perpendicular to the surface of the layer of the first material, and a dimension of at least about 0.5 microns in a direction parallel to the surface of the layer of the first material.

The layer of the first material can be disposed over the entire surface of the substrate.

The master can include a layer of an additional material disposed over the surface of the pattern of the second material. The additional material is preferably non-ferromagnetic (e.g., has a magnetic permeability of less than about 1.1). In certain embodiments, the additional material is also corrosion resistant and/or capable of providing mechanical protection. The additional material can be, for example, carbon, chrome, silicon or an oxide of the second material. The layer of the additional material can have a dimension of around 50 Å to 250 Å in a direction perpendicular to the surface of the layer of the first material.

The master can include a layer of an additional material disposed between the substrate and the layer of the first material. The additional material can be, for example, chrome or silicon.

In another aspect, the invention features a master for printing a servo pattern. The master includes a substrate, a layer of a first material disposed over at least a portion of a surface of the substrate and a pattern of a second material disposed over at least a portion of a surface of the layer of first material. Preferably, the layer of the first material has a dimension of about 0.25-0.6 microns or greater in a direction perpendicular to the surface of the substrate. The first material can be, for example, nickel, cobalt, iron, a nickel alloy, a cobalt alloy or an iron alloy. The second material can be, for example, nickel, cobalt, iron, a nickel alloy, a cobalt alloy or an iron alloy. The first and second materials can be the same material, or they can be different materials.

The pattern of the second material can be formed by etching portions of the layer of the first material. The pattern of the second material can be, for example, a pattern of teeth. The teeth preferably have a dimension of about 1 micron in a direction perpendicular to the surface of the layer of the first material, and a dimension at least about 0.5 micron in a direction parallel to the surface of the layer of the first material.

The layer of the first material can be disposed over the entire surface of the substrate.

The master can include a layer of an additional material disposed over the surface of the pattern of the second material. The additional material can have, for example, a magnetic permeability of less than about five. The additional material can be, for example, carbon, chrome, silicon or an oxide of the second material. The layer of the additional material can have a dimension of around 50 Å to 250 Å in a direction perpendicular to the surface of the layer of the first material.

The master can include a layer of an additional non-ferromagnetic material disposed between the substrate and the layer of the first material. The additional material can be, for example, chrome or silicon.

In a further aspect, the invention features a master for printing a servo pattern. The master includes a substrate, a pattern of a first material disposed over at least a portion of a surface of the substrate and a layer of a second material disposed over at least a portion of the pattern of the first material. The first material has a magnetic permeability of at least about 50, preferably around 100-1000.

Generally, the second material is non-ferromagnetic. Typically, this material has a magnetic permeability of less than about 1.1. The second material can be formed of, for example, carbon, chrome, silicon or an oxide of the second material. The layer of the second material can have a dimension of around 50 Å to 250 Å in a direction perpendicular to the surface of the substrate.

In one aspect, the invention features a system that includes a master for printing a servo pattern and a recording medium (e.g., a disk, a tape, a credit card). The master includes a substrate, a layer of a first material disposed over at least a portion of a surface of the substrate and a pattern of a second material disposed over at least a portion of a surface of the layer of first material. The first material has a magnetic permeability of at least about 50, preferably around 100-1000. The recording medium is configured so that the system can be used to form a magnetic pattern in the recording medium via a contact magnetic printing process.

In another aspect, the invention features a system that includes a master for printing a servo pattern and a recording medium (e.g., a disk, a tape, a credit card). The master includes a substrate, a layer of a first material disposed over at least a portion of a surface of the substrate and a pattern of a second material disposed over at least a portion of a surface of the layer of the first material. The layer of the first material has a dimension of around 0.25-0.6 microns or greater. The recording medium is configured so that the system can be used to form a magnetic pattern in the recording medium via a contact magnetic printing process.

In a further aspect, the invention features a system that includes a master for printing a servo pattern and a recording medium (e.g., a disk, a tape, a credit card). The master includes a substrate, a pattern of a first material disposed over at least a portion of a surface of the substrate and a layer of a second material disposed over at least a portion of the pattern of the first material. The first material has a magnetic permeability of at least about 50, preferably around 100-1000. The recording medium is configured so that the system can be used to form a magnetic pattern in the recording medium via a contact magnetic printing process.

In other aspects, the masters can be used in methods to print on recording media. In certain embodiments, the masters can allow for the use of a relatively a low magnitude magnetic field during the printing process.

In some embodiments, the masters can be used to form a recording medium having a magnetic pattern with reduced variability (e.g., reduced variability relative to the desired direction of the magnetic pattern in the recording medium and/or reduced variability relative to the desired magnitude of magnetization in the recording medium) relative to certain other recording media formed by servo printing with a master that does not have the underlayer.

In certain embodiments, the masters can be used to form a recording medium with decreased occurrence of undesirable signals (e.g., subpulses) when reading information from the recording medium.

In some embodiments, the masters can have a relatively long useful lifetime.

DETAILED DESCRIPTION

Figure 1:
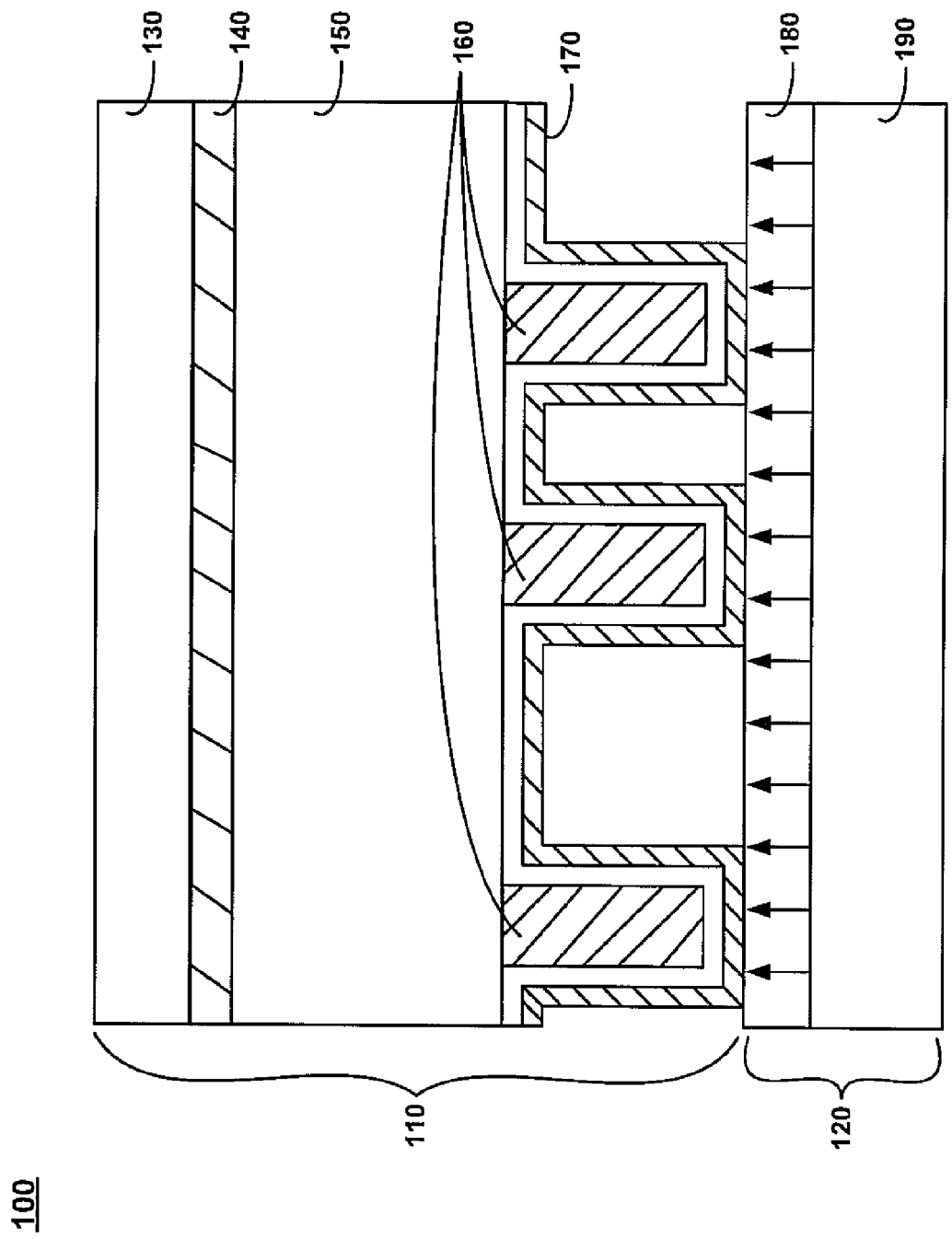
FIG. 1 is a partial cross-sectional view of an embodiment of a system for perpendicular media printing.

FIG. 1 shows a partial cross-sectional view of an embodiment of a system 100 for perpendicular media printing. System 100 includes a master 110 for printing servo patterns and a recording portion 120. Master 110 includes a substrate 130, an adhesion layer 140, an underlayer 150, a pattern of teeth 160, an adhesion layer 165 and a protective layer 170. Recording portion 120 includes a recording medium 180 (e.g., a disk, a tape, a credit card) and an underlayer 190. Recording medium 180 is shown as having a uniform direction of pre-magnetization (indicated by the arrows).

Figure 2:
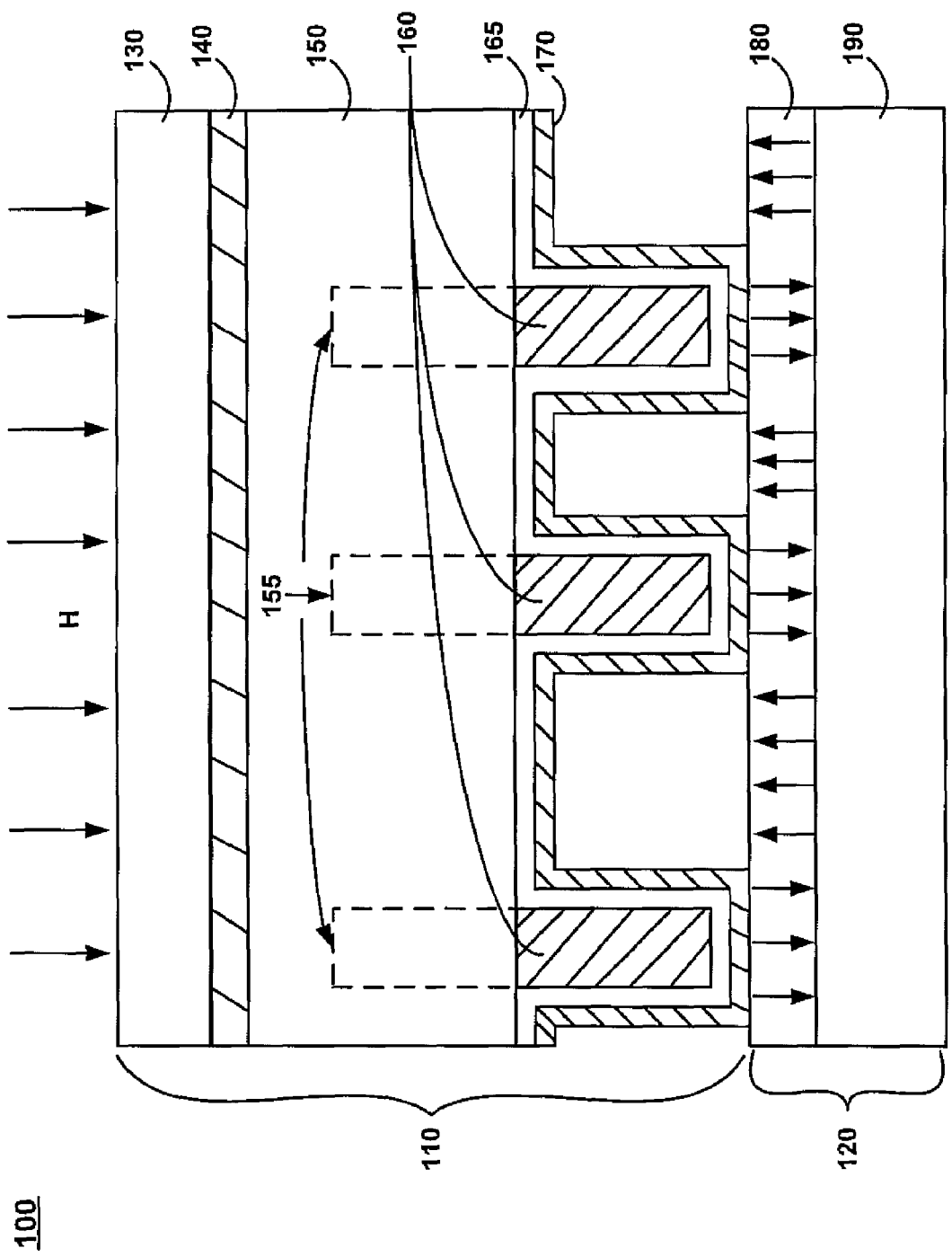
FIG. 2 is a partial cross-sectional view of an embodiment of the system of FIG. 1 during the printing process.

FIG. 2 shows system 100 being exposed to uniform magnetic field H (indicated by the arrows) during perpendicular media printing. Uniform magnetic field H is in a direction substantially opposite to the direction of pre-magnetization of recording medium 180.

Figure 3:
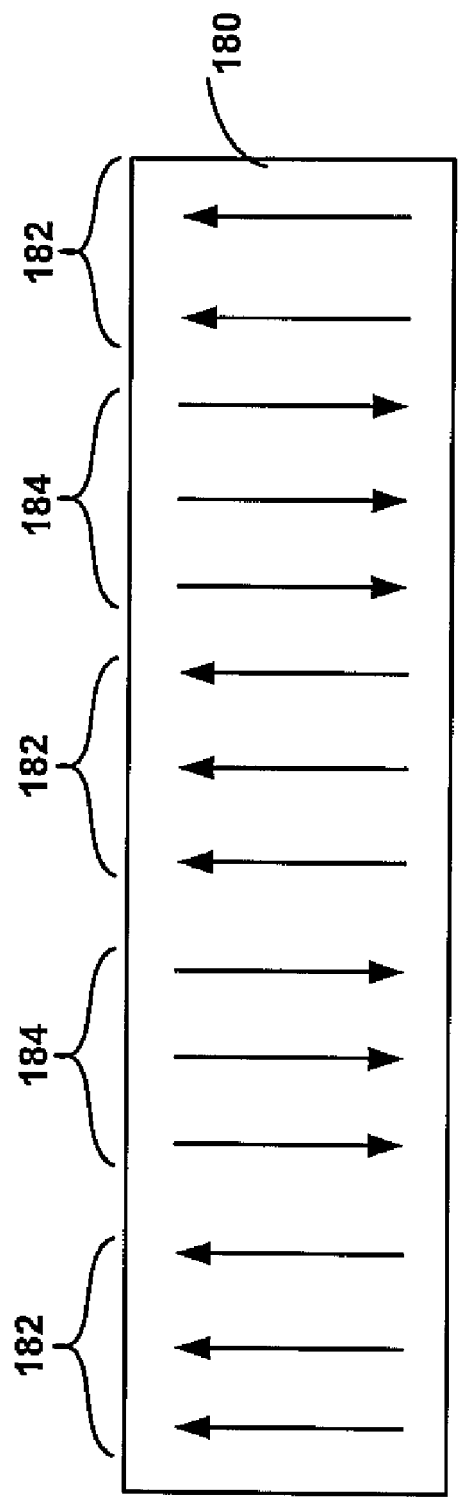
FIG. 3 is a partial cross-sectional view of a recording medium after the printing process.

FIG. 3 shows recording medium 180 after the printing process. Medium 180 includes regions 184 that were beneath teeth 160 during the printing process, and regions 182 that were not beneath teeth 160 during the printing process. Regions 182 have a direction of magnetization that is substantially aligned with the direction of pre-magnetization of medium 180, and regions 184 have a direction of magnetization that is substantially aligned with the uniform magnetic field used during the printing process. Within a given region 182 the magnitude of magnetization is substantially constant, and within a given region 184 the magnitude of magnetization is substantially constant.

Figure 4:
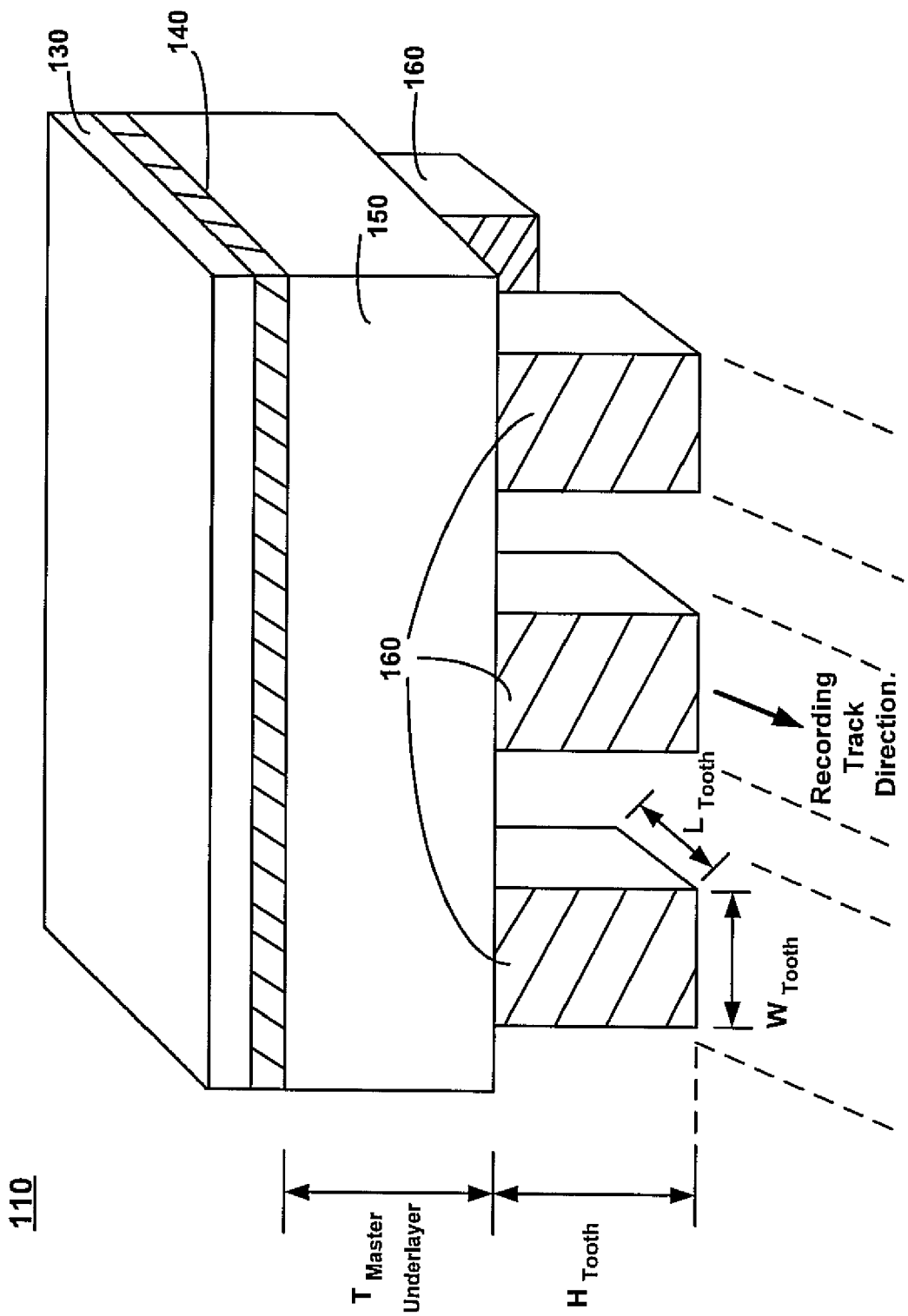
FIG. 4 is a three-dimensional front view illustrating various dimensions of the master for printing servo patterns of FIG. 1.

FIG. 4 shows a three-dimensional front view of the master 110. For simplicity, the adhesion and protective layers 165 and 170 are not shown so that the various dimensions of the teeth 160 may be better illustrated. Such dimensions include the height of a tooth 160 ($H_{tooth}$), the length of a tooth ($L_{tooth}$) and the width of a tooth ($W_{tooth}$). Further, the thickness of the underlayer 150 ($T_{master\,underlayer}$) is also labeled on the master 110.

Without wishing to be bound by theory, it is believed that during the perpendicular media printing process virtual images of teeth 160 form in underlayers 150 and 190, and that the virtual images increase the apparent height of teeth 160. When the applied magnetic field does not saturate the media underlayer 190, a semi-infinite column of tooth images is believed to form in the underlayer 150 directly above each tooth 160. However, in operation, the applied field typically saturates the underlayer 190 so only a single virtual image 155 is induced directly above each tooth. It is believed that these virtual images increase the apparent height of the teeth 160, thereby directing field lines of the applied field H to be concentrated in regions 184 and/or shielded from the regions 182. It is further believed that this allows for the use of a relatively low magnitude magnetic field to form the magnetic pattern in recording medium 110, which can reduce certain undesirable effects associated with using higher magnitude magnetic fields. For example, using a relatively high magnitude magnetic field can result in substantial variability in the magnitude and/or the direction of the magnetic field in a given region 182 and/or a given region 184. Such variability can cause undesirable signals (e.g., subpulses) when reading information from recording medium 110.

In general, during the perpendicular media printing process, underlayer 150 magnifies the magnetic field under teeth 160 and reduces the magnetic field between teeth 160. Typically, this results in the formation of a relatively well defined magnetic pattern in recording medium 180.

Usually, underlayer 150 is formed of a ferromagnetic material. In some embodiments, underlayer 150 has a magnetic permeability of at least about 50, preferably around 100-1000. An illustrative and nonlimiting list of materials from which underlayer 150 can be formed includes nickel, cobalt, iron, nickel alloys, cobalt alloys and iron alloys (e.g., NiFe, CoFe, NiCo).

The thickness of underlayer 150 can be varied as desired. In general, the thickness of underlayer 150 should be selected so that the magnetic permeability of underlayer 150 does not decrease substantially during magnetic printing (e.g., underlayer 150 should be thick enough so that underlayer 150 does not become magnetically saturated during servo printing). It is generally preferable for underlayer 150 to be relatively thick. In practice, it has been determined that the thickness of the underlayer 150 may be selected in accordance with the following relation:

$$T_{master\ underlayer} \cdot (B_S)_{master\ underlayer} \geq \left(\frac{1}{2}\right) W_{tooth} \cdot (B_S)_{tooth} \quad (1)$$

where $T_{master\ underlayer}$ is the thickness of the underlayer 150, $(B_s)_{master\ underlayer}$ is the magnetic saturation flux density of the material that forms underlayer 150, $W_{tooth}$ is the width of a tooth 160 and $(B_s)_{tooth}$ is the magnetic saturation flux density of the material forming the teeth 160. Here, it is assumed that the teeth are of uniform width and made of the same material, and that the length of a tooth, $L_{tooth}$ is much larger than its width. For example, if the underlayer 150 and teeth 160 are formed using the same ferromagnetic material, i.e., $(B_s)_{tooth}$ equals $(B_s)_{master\ underlayer}$, then the thickness of the underlayer 150 is selected such that the underlayer 150 is at least half as thick as a tooth is wide. Of course, those skilled in the art will appreciate that the thickness of the underlayer 150 may be selected using Equation 1 above in the more general case where the teeth 160 and underlayer 150 are fabricated from different magnetic materials. Illustratively, underlayer 150 is preferably around 0.25-0.6 microns thick. For instance, in some embodiments, the underlayer 150 has a thickness of from about 0.4 micron to about 0.6 micron.

Typically, underlayer 190 is formed of a ferromagnetic material. In some embodiments, underlayer 190 has a magnetic permeability of at least about at least about 50, preferably around 100-1000. Exemplary materials from which underlayer 190 can be formed includes nickel, cobalt, iron, nickel alloys, cobalt alloys and iron alloys (e.g., NiFe, CoFe, NiCo). The thickness of underlayer 190 can be varied as desired. In certain embodiments, underlayer 190 has a thickness of around 0.05-0.8 microns. In general, the teeth 160 are formed of a ferromagnetic material. In some embodiments, teeth 160 have a magnetic permeability of at least about 50, preferably around 100-1000. An illustrative and nonlimiting list of examples of materials from which teeth 160 can be formed includes nickel, cobalt, iron, nickel alloys, cobalt alloys and iron alloys (e.g., NiFe, CoFe, NiCo).

The height of teeth 160 can be varied as desired. It is generally preferable for teeth 160 to be relatively tall, with a height of around 1 micron. The width of teeth 160 can be varied as desired. The width of the teeth 160 are preferably selected in accordance with Equation 1 above. Preferably, the teeth 160 have a width of around 0.5 microns. It is noted that the length of the teeth 160 may vary from tooth to tooth, depending on the magnetic pattern being written. Typically, adhesion layer 140 is formed of one or more materials that assist in the adhesion of underlayer 150 and substrate 130. Usually, adhesion layer 140 is formed of a non-ferromagnetic material. In some embodiments, adhesion layer 140 has a magnetic permeability of at most about five. An illustrative and nonlimiting list of materials that can be used in adhesion layer 140 includes chrome and silicon.

The thickness of adhesion layer 140 can be varied as desired. Preferably, the adhesion layer 140 has a thickness of around 10 Å to 500 Å. The adhesion layer 165 is formed of a material that can adhere to underlayer 150, teeth 160 and protective layer 170. Examples of such materials include, but are not limited to, chrome and silicon. The thickness of adhesion layer 165 can be varied as desired. In a preferred embodiment, adhesion layer 165 has a thickness of around 10 Å to 500 Å. Generally, protective layer 170 should be capable of performing one or more of the following functions. One function is to protect teeth 160 from corrosion. Another function is to protect teeth 160 from mechanical damage, such as the kind that can occur during contact with recording medium 180. An additional function is to make it relatively easy to remove magnetic particles during a cleaning operation. Thus, the protective layer 170 is typically formed of a material that is relatively hard, relatively corrosion resistant, and non-ferromagnetic. An illustrative and nonlimiting list of examples of materials from which protective layer 170 can be formed includes carbon, silicon, chrome and metal oxides (e.g., an oxide of the material from which underlayer 150 is formed). An example of such a metal oxide is cobalt oxide, which can be formed, for example, by exposing cobalt to an oxygen rich environment at a temperature of about 450° C. for about an hour. The thickness of protective layer 170 can be varied as desired. Preferably, the protective layer 170 has a thickness of around 50 Å to 250 Å. In general, substrate 130 can be formed of any material capable of supporting the other layers present in master 110. For example, substrate 130 can be formed of a material that is ferromagnetic or non-ferromagnetic. In certain embodiments, substrate 130 is formed of silicon.

In general, the masters described herein can be prepared using standard methods known to those skilled in the art. In certain embodiments, a master is prepared as follows. Substrate 130 is prepared by polishing a silicon wafer. Adhesion layer 140 is formed on the polished surface of substrate 130 using, for example, sputtering. It is to be noted that adhesion layer 140 can also act as a plating seed layer for underlayer 150. Underlayer 150 is formed by plating a thick layer of the material (e.g., about one micron thick layer) on the seed layer. Teeth 160 may be formed by an additive process, as follows. A layer of photoresist is deposited (e.g., spin deposited) onto underlayer 150, and the photoresist layer is patterned, such as by exposure to a pattern of ultraviolet (UV) radiation to sensitize portions of the photoresist layer. These portions are then removed during a chemical development process. A layer of material (e.g., about one micron thick layer) is plated into the voids in the patterned photoresist layer. The photoresist is removed, forming the teeth 160. Adhesion layer 165 is formed on teeth 160 and portions of underlayer 150 using, for example, sputter deposition. Protective layer 170 is deposited on adhesion layer 165 using, for example, sputter deposition.

While certain methods for preparing a master for servo printing has been described, those skilled in the art will appreciate that other methods can also be used. For example, in some embodiments, underlayer 150 and teeth 160 are formed by a subtractive process, as follows. A seed layer of material is formed on adhesion layer 140, and then a relatively thick layer of material (e.g. about two microns thick) is plated on the seed layer. A layer of photoresist is deposited (e.g., spin deposited) onto the thick layer of material, and the photoresist layer is patterned, such as by exposure to a pattern of UV radiation to cure portions of the photoresist layer. Portions of the photoresist layer are then removed. The thick layer of material is partially etched through the removed portions of the photoresist layer to form openings in the thick layer of material corresponding to the openings between teeth 160. The remaining portions of the photoresist layer are then removed, providing underlayer 150 and teeth 160.

Moreover, although certain embodiments of a master for servo printing have been described, other embodiments are also contemplated. As an example, a master for servo printing can be prepared without a protective layer. As another example, a master for servo printing can be prepared without one or both adhesion layers. As an additional example, a master for servo printing can be prepared with a protective layer but without an underlayer.

Furthermore, while some embodiments of a recording portion of a system have been described, the invention is not limited to these embodiments. For example, in some embodiments, the recording portion of the system does not have an underlayer. It is believed that in these embodiments virtual images can still form in the underlayer in the master, which can result in one or more of the advantages described herein.

In addition, while perpendicular media printing methods have been described, other methods can also be used with the systems disclosed herein. For example, in some embodiments, longitudinal media printing systems are used.

Other embodiments are in the claims.

What is claimed is:

1. A device comprising:
   a substrate;
   a first material disposed over a portion of a surface of said substrate, wherein said first material comprises a first magnetic permeability; and
   a second material disposed over a portion of a surface of said first material, wherein:
      said second material comprises a pattern operable for use in a magnetic printing process,
      dimensions of said pattern are selected such that a thickness of said first material multiplied by a magnetic saturation flux density of said first material is greater than or equal to one half of a width of said pattern multiplied by a magnetic saturation flux density of said second material,
      said second material comprises a second magnetic permeability, and
      said second material is different from said first material.

2. The device as described by claim 1, wherein said pattern is formed using an additive process.

3. The device as described by claim 1, wherein said pattern is formed using a subtractive process.

4. The device as described by claim 1 further comprising:
   a protective layer disposed over a portion of said pattern.

5. The device as described by claim 4, wherein said protective layer is selected form a group consisting of carbon, silicon, chrome, and metal oxides.

6. The device as described by claim 1, wherein said first magnetic permeability of at least 50, and wherein said second magnetic permeability is less than 1.1.

7. A master for printing servo pattern comprising:
   a substrate;
   a first material disposed over a portion of a surface of said substrate, wherein said first material comprises a first magnetic permeability; and
   a second material disposed over a portion of a surface of said first material, wherein:
      said second material comprises a pattern associated with a width operable for use in a magnetic printing process,
      dimensions of said pattern are selected such that a thickness of said first material multiplied by a magnetic saturation flux density of said first material is greater than or equal to one half of a width of said pattern multiplied by a magnetic saturation flux density of said second material,
      said second material comprises a second magnetic permeability,
      said second material is different from said first material, and
      a selected thickness of said first material is operable to reduce magnetic saturation during servo printing.

8. The master as described by claim 7, wherein said pattern is formed using an additive process.

9. The master as described by claim 7, wherein said pattern is formed using a subtractive process.

10. The master as described by claim 7 further comprising:
    a protective layer disposed over a portion of said pattern.

11. The master as described by claim 10, wherein said protective layer is selected form a group consisting of carbon, silicon, chrome, and metal oxides.

12. The master as described by claim 7, wherein said first magnetic permeability of at least 50, and wherein said second magnetic permeability is less than 1.1.

* * * * *